US012753371B2

(12) United States Patent
Creutz et al.

(10) Patent No.: US 12,753,371 B2
(45) Date of Patent: Oct. 6, 2026

(54) FABRIC SOFTENER FORMULATION

(71) Applicant: Dow Silicones Corporation, Midland, MI (US)

(72) Inventors: Serge Creutz, Liege (BE); Rahma Benbakoura, Quaregnon (BE); Jacqueline L'hostis, Silly (BE); Flore Vandemeulebroucke, Manage (BE)

(73) Assignee: Dow Silicones Corporation, Midland, MI (US)

( * ) Notice: Subject to any disclaimer, the term of this patent is extended or adjusted under 35 U.S.C. 154(b) by 359 days.

(21) Appl. No.: 18/700,431

(22) PCT Filed: Oct. 25, 2022

(86) PCT No.: PCT/US2022/047628

§ 371 (c)(1),
(2) Date: Apr. 11, 2024

(87) PCT Pub. No.: WO2023/076193

PCT Pub. Date: May 4, 2023

(65) Prior Publication Data

US 2024/0409847 A1 Dec. 12, 2024

Related U.S. Application Data

(60) Provisional application No. 63/272,702, filed on Oct. 28, 2021.

(51) Int. Cl.

| | |
|---|---|
| ***B08B 3/04*** | (2006.01) |
| ***C11D 3/00*** | (2006.01) |
| ***C11D 3/37*** | (2006.01) |
| ***D06L 1/12*** | (2006.01) |

(52) U.S. Cl.

CPC ............ *C11D 3/373* (2013.01); *C11D 3/0015* (2013.01); *C11D 3/0026* (2013.01); *C11D 3/3707* (2013.01); *D06L 1/12* (2013.01)

(58) Field of Classification Search

CPC ..... C11D 3/0015; C11D 3/0026; C11D 3/162; C11D 3/373; C11D 3/3734; B08B 3/04; D06F 35/005

See application file for complete search history.

(56) References Cited

U.S. PATENT DOCUMENTS

| | | | |
|---|---|---|---|
| 4,848,981 A | 7/1989 | Kasprzak et al. | |
| 4,978,462 A | 12/1990 | Sheppard | |
| 6,831,055 B1 | 12/2004 | Kvita et al. | |

FOREIGN PATENT DOCUMENTS

| | | | |
|---|---|---|---|
| EP | 0578424 | 1/1994 | |
| EP | 1075864 | 2/2001 | |
| EP | 1075864 A2 * | 2/2001 | ............. C11D 3/162 |
| WO | WO-03089108 A1 * | 10/2003 | ............. C11D 3/373 |

OTHER PUBLICATIONS

Sibilia, "A Guide to Materials Characterization and Chemical Analysis", 1988, p. 81-84.
Yau, "Modern Size Exclusion Chromatography", Wiley-Interscience, 1979.

* cited by examiner

*Primary Examiner* — Brian P Mruk
(74) *Attorney, Agent, or Firm* — Thomas S. Deibert

(57) ABSTRACT

A drainage enhancing aqueous fabric softener formulation is provided, including: water; a fabric softening agent; and a drainage aid component, wherein the drainage aid component comprises: 40-99 wt %, based on weight of the drainage aid component, of an organopolysiloxane comprising: 0-60 mol % of units of formula I and 40-100 mol % of units of formula II $$R_x^1SiO_{(4-x)/2} \quad (I)$$

$$R_y^1R_z^2SiO_{(4-y-z)/2} \quad (II)$$

wherein x is 0-3; y is 0-2; z is 1-2; y+z is 1-3; $R^1$ is selected from a hydrogen, a hydroxy group and a group having 1 to 8 carbon atoms; $R^2$ is an $-A_cR^3$ group; wherein A is a divalent linking group; c is 0-1; $R^3$ is a group having 9 to 35 carbon atoms; 1-30 wt %, based on weight of the drainage aid component, of an organosilicon resin; and 0 to 30 wt %, based on weight of the drainage aid component, of a hydrophobic additive.

10 Claims, No Drawings

FABRIC SOFTENER FORMULATION

The present invention relates to a drainage enhancing aqueous fabric softener formulation. In particular, the present invention relates to a incorporating water; a fabric softening agent; and a drainage aid component, wherein the drainage aid component comprises: 40 to 99 wt %, based on weight of the drainage aid component, of an organopolysiloxane comprising: 0 to 60 mol % of units of formula I and 40 to 100 mol % of units of formula II $$R_x^1SiO_{(4-x)/2} \quad (I)$$

$$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^1$ is independently selected from a hydrogen, a hydroxy group and a group having 1 to 8 carbon atoms; wherein each $R^2$ is an $-A_cR^3$ group; wherein A is a divalent linking group; wherein c is selected from the group consisting of 0 and 1; wherein each $R^3$ is independently selected from a group having 9 to 35 carbon atoms; 1 to 30 wt %, based on weight of the drainage aid component, of an organosilicon resin; and 0 to 30 wt %, based on weight of the drainage aid component, of a hydrophobic additive.

There is increasing pressure from governments and consumers to improve the energy efficiency of daily activities such as cleaning laundry. A historical approach to improving the energy efficiency of cleaning laundry has been the development of laundry detergent formulations that offer cleaning at reduced washing temperatures. However, consumers are increasingly exhibiting a tendency to increase the temperature of the wash having a perception that higher wash temperatures will better facilitate the killing of contaminant microbes present in the laundry. That is, while consumers desire energy efficiency, many are unwilling to sacrifice efficacy in return for energy efficiency. Accordingly, there is a need for additives that a consumer may apply, independent of other laundry products, to reduce carbon footprint by enhancing the energy efficiency of the laundry cleaning process while facilitating the continued use of the consumer's current trusted laundry products.

Accordingly, there remains a desire to find alternative ways to reduce the energy needed to do laundry. One approach to further improve the energy efficiency of the laundry process would be to reduce the energy required to dry laundry after washing. A way to achieve that end might involve the enhanced removal of residual water from the laundry during the spinning cycle leaving fabrics drier when removed from the washer. Drier fabrics out of the washer would result in less water requiring removal during the drying process. In addition, better removal of residual water from the fabrics might also be anticipated to reduce malodor; particularly when drying is performed in under humid conditions (e.g., line drying during the wet season).

Hence, there remains a need for new drainage enhancing aqueous fabric softener formulations that facilitate a reduction in the energy demand associated with the washing of laundry. In particular, there remains a need for new drainage enhancing aqueous fabric softener formulations that enhance the removal of residual water from fabrics during the rinse cycle.

The present invention provides a drainage enhancing aqueous fabric softener formulation, comprising: 9.992 to 98.992 wt %, based on weight of the drainage enhancing aqueous fabric softening formulation, of water; 1 to 90 wt %, based on weight of the drainage enhancing aqueous fabric softening formulation, of a fabric softening agent; and 0.008 to <0.1 wt %, based on weight of the drainage enhancing aqueous fabric softener formulation, of a drainage aid component, wherein the drainage aid component comprises: 40 to 99 wt %, based on weight of the drainage aid component, of an organopolysiloxane comprising: 0 to 60 mol % of units of formula I and 40 to 100 mol % of units of formula II $$R_x^1SiO_{(4-x)/2} \quad (I)$$

$$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^1$ is independently selected from a hydrogen, a hydroxy group and a group having 1 to 8 carbon atoms; wherein each $R^2$ is an $-A_cR^3$ group; wherein A is a divalent linking group; wherein c is selected from the group consisting of 0 and 1; wherein each $R^3$ is independently selected from a group having 9 to 35 carbon atoms; 1 to 30 wt %, based on weight of the drainage aid component, of an organosilicon resin; and 0 to 30 wt %, based on weight of the drainage aid component, of a hydrophobic additive.

The present invention provides a drainage enhancing aqueous fabric softener formulation, comprising: 9.992 to 98.992 wt %, based on weight of the drainage enhancing aqueous fabric softening formulation, of water; 1 to 90 wt %, based on weight of the drainage enhancing aqueous fabric softening formulation, of a fabric softening agent; and 0.008 to <0.1 wt %, based on weight of the drainage enhancing aqueous fabric softener formulation, of a drainage aid component, wherein the drainage aid component comprises: 40 to 99 wt %, based on weight of the drainage aid component, of a linear organopolysiloxane of formula III

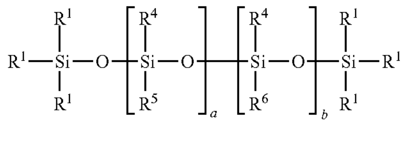

(III)

wherein each $R^1$ is a methyl group; wherein each $R^4$ is independently selected from the group consisting of a hydrogen, a group having 1 to 8 carbon atoms, an $R^5$ and an $R^6$; wherein each $R^5$ is an $-A_cR^7$ group; wherein each $R^7$ is independently selected from an acyclic group having 10 to 20 carbon atoms; wherein c is selected from the group consisting of 0 and 1; and wherein A is a divalent linking group consisting of (i) oxygen; (ii) carbon and hydrogen or (iii) carbon, hydrogen, oxygen, and optionally, nitrogen, sulfur or phosphorus; wherein each $R^6$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; wherein a is 10 to 500; wherein b is 0 to 250; wherein a+b is 10 to 500; wherein a>b; and wherein ≥60 mol % of the Si atoms in the linear organopolysiloxane of formula III have an $R^5$ group attached; 1 to 30 wt %, based on weight of the drainage aid component, of an organosilicon resin; and 0 to 30 wt %, based on weight of the drainage aid component, of a hydrophobic additive.

The present invention provides a method for washing laundry comprising: adding a soiled fabric article to a laundry washing machine or a laundry wash basin; dosing a wash water to the laundry washing machine or the laundry wash basin; dosing to the laundry washing machine or the laundry wash basin with a laundry detergent formulation; applying the wash water and the laundry detergent formulation to the soiled fabric article to provide a washed fabric article; dosing a rinse water to the laundry washing machine or the laundry wash basin; dosing a drainage enhancing aqueous fabric softener formulation of the present invention to the laundry washing machine or the laundry wash basin; applying the rinse water to the washed fabric article; and spinning the rinse water from the washed fabric article in a spin cycle; wherein at least one of the rinse water is exposed to the drainage enhancing aqueous fabric softener formulation before or during application thereof to the washed fabric article.

The present invention provides a method of improving the energy efficiency of machine washing laundry, comprising: adding a soiled fabric article to a laundry washing machine; selecting a drainage enhancing aqueous fabric softener formulation of the present invention; dosing the drainage enhancing aqueous fabric softener formulation to the laundry washing machine; dosing a laundry detergent formulation to the laundry washing machine; dosing a wash water to the laundry washing machine; applying the wash water and laundry detergent formulation to the soiled fabric article to provide a washed fabric article; dosing a rinse water to the laundry washing machine or the laundry wash basin; applying the rinse water to the washed fabric article; and spinning the rinse water from the washed fabric article in a spin cycle; wherein the rinse water is exposed to the drainage enhancing aqueous fabric softener formulation before or during application thereof to the washed fabric article; and wherein the organopolysiloxane in the selected solid laundry drainage aid composition is chosen based on the ability to reduce residual water entrained with the washed fabric article at completion of the spin cycle.

DETAILED DESCRIPTION

Surprisingly, drainage enhancing aqueous fabric softener formulations comprising a drainage aid component of the present invention facilitate exceptional water removal from laundry during the rinse cycle; providing the opportunity for significant energy savings.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

Preferably, the drainage enhancing aqueous fabric softener formulation of the present invention, comprises: 9.992 to 98.992 wt % (preferably, 29.991 to 98.991 wt %; more preferably, 59.99 to 98.99 wt %; most preferably, 74.98 to 97.98 wt %), based on weight of the drainage enhancing aqueous fabric softening formulation, of water; 1 to 90 wt % (preferably, 1 to 70 wt %; more preferably, 1 to 40 wt %; most preferably, 2 to 25 wt %), based on weight of the drainage enhancing aqueous fabric softening formulation, of a fabric softening agent; and 0.008 to <0.1 wt % (preferably, 0.009 to 0.09 wt %; more preferably, 0.01 to 0.05; most preferably, 0.02 to 0.04 wt %), based on weight of the drainage enhancing aqueous fabric softener formulation, of a drainage aid component, wherein the drainage aid component comprises: 40 to 99 wt % (preferably, 55 to 99 wt %; more preferably, 65 to 98 wt %; most preferably, 77 to 97 wt %), based on weight of the drainage aid component, of an organopolysiloxane comprising: 0 to 60 mol % of units of formula I and 40 to 100 mol % of units of formula II $$R_x^1SiO_{(4-x)/2} \quad (I)$$

$$R_y^1R_z^2SiO_{(4-y-z)/2} \quad (II)$$

wherein x is selected from the group consisting of 0, 1, 2 and 3; wherein y is selected from the group consisting of 0, 1 and 2 (preferably, 0 and 1; more preferably, 1); wherein z is selected from the group consisting of 1 and 2 (preferably, 1); with the proviso that y+z is 1, 2 or 3 (preferably, 2); wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group) (preferably, wherein ≤one $R^1$ per Si is a hydroxy group); wherein each $R^2$ is an $-A_cR^3$ group; wherein A is a divalent linking group; wherein c is selected from the group consisting of 0 and 1 (preferably, 1); wherein each $R^3$ is independently selected from a group having 9 to 35 carbon atoms (preferably, 10 to 30 carbon atoms; more preferably, 10 to 20 carbon atoms; most preferably, 10 to 15 carbon atoms); 1 to 30 wt % (preferably, 1 to 25 wt %; more preferably, 2 to 20 wt %; most preferably, 3 to 15 wt %), based on weight of the drainage aid component, of an organosilicon resin; 0 to 30 wt % (preferably, 0 to 20 wt %; more preferably, 0 to 15 wt %; most preferably, 0 to 8 wt %), based on weight of the drainage aid component, of a hydrophobic additive.

The drainage enhancing aqueous fabric softening formulation of the present invention comprises 9.992 to 98.992 wt % (preferably, 29.991 to 98.991 wt %; more preferably, 59.99 to 98.99 wt %; most preferably, 74.98 to 97.98 wt %), based on weight of the drainage enhancing aqueous fabric softening formulation, of water. Preferably, the drainage enhancing aqueous fabric softening formulation of the present invention, comprises 9.992 to 98.992 wt % (preferably, 29.991 to 98.991 wt %; more preferably, 59.99 to 98.99 wt %; most preferably, 74.98 to 97.98 wt %), based on weight of the drainage enhancing aqueous fabric softening formulation, of water; wherein the water is at least one of distilled and deionized water. More preferably, the drainage enhancing aqueous fabric softening formulation of the present invention, comprises 9.992 to 98.992 wt % (preferably, 29.991 to 98.991 wt %; more preferably, 59.99 to 98.99 wt %; most preferably, 74.98 to 97.98 wt %), based on weight of the drainage enhancing aqueous fabric softening formulation, of water; wherein the water is deionized water.

The drainage enhancing aqueous fabric softener formulation of the present invention, comprises: 1 to 90 wt % (preferably, 1 to 70 wt %; more preferably, 1 to 40 wt %; most preferably, 2 to 25 wt %), based on weight of the drainage enhancing aqueous fabric softener formulation, of a fabric softening agent. Preferably, the drainage enhancing aqueous fabric softener formulation of the present invention, comprises: 1 to 90 wt % (preferably, 1 to 70 wt %; more preferably, 1 to 40 wt %; most preferably, 2 to 25 wt %), based on weight of the drainage enhancing aqueous fabric softener formulation, of a fabric softening agent; wherein the fabric softening agent is an esterquat. More preferably, the drainage enhancing aqueous fabric softener formulation of the present invention, comprises: 1 to 90 wt % (preferably, 1 to 70 wt %; more preferably, 1 to 40 wt %; most preferably, 2 to 25 wt %), based on weight of the drainage enhancing aqueous fabric softener formulation, of a fabric softening agent; wherein the fabric softening agent is an esterquat comprising a cationic nitrogen ($N^+$) atom, at least one fatty carbon chain containing 4 to 36 carbon atoms, and at least one ester function. The fatty carbon chain may optionally comprise hetero atoms other than carbon atoms (e.g., Si atoms). The cationic nitrogen atom may be linked to the at least one fatty carbon chain via ester functions, for example via: $—(CH_2)_a—O—C(=O)—$ chains in which a is 0 to 5 and/or $=C(—O—C(=O)—(CH_2)_b—CH_3)_2$ in which b is 4 to 36. Various types of esterquats may be suitable for use in the fabric care formulations of the present invention, including, for example, monoesterquats (EQ), triester-quaternary ammonium compounds (TEQ) and diester-quaternary ammonium compounds (DEQ). These compounds may also comprise a mixture of mono-(I), di-(II) and tri-(III) ester components. Preferably, the esterquat is a partially hydrogenated palm esterquat.

Preferably, the drainage enhancing aqueous fabric softener solution of the present invention, comprises: 0.008 to <0.1 wt % (preferably, 0.009 to 0.09 wt %; more preferably, 0.01 to 0.05; most preferably, 0.02 to 0.04 wt %), based on weight of the drainage enhancing aqueous softener solution of the present invention, of a drainage aid component, wherein the drainage aid component comprises: 40 to 99 wt % (preferably, 55 to 99 wt %; more preferably, 65 to 98 wt %; most preferably, 77 to 97 wt %), based on weight of the drainage aid component, of an organopolysiloxane; 1 to 30 wt % (preferably, 1 to 25 wt %; more preferably, 2 to 20 wt %; most preferably, 3 to 15 wt %), based on weight of the drainage aid component, of an organosilicon resin; and 0 to 30 wt % (preferably, 0 to 20 wt %; more preferably, 0 to 15 wt %; most preferably, 0 to 8 wt %), based on weight of the drainage aid component, of a hydrophobic additive.

Preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane comprises: 0 to 60 mol % of units of formula I and 40 to 100 mol % of units of formula II $$R_x^1SiO_{(4-x)/2} \quad (I)$$

$$R_y^1R_z^2SiO_{(4-y-z)/2} \quad (II)$$

wherein x is selected from the group consisting of 0, 1, 2 and 3; wherein y is selected from the group consisting of 0, 1 and 2 (preferably, 0 and 1; more preferably, 1); wherein z is selected from the group consisting of 1 and 2 (preferably, 1); with the proviso that y+z is 1, 2 or 3 (preferably, 2); wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group) (preferably, wherein ≤one $R^1$ per Si is a hydroxy group); wherein each $R^2$ is an $-A_cR^3$ group; wherein A is a divalent linking group; wherein c is selected from the group consisting of 0 and 1 (preferably, 0); wherein each $R^3$ is independently selected from a group having 9 to 35 carbon atoms (preferably, 10 to 30 carbon atoms; more preferably, 10 to 20 carbon atoms; most preferably, 10 to 15 carbon atoms) (preferably, wherein each $R^3$ contains 0 to 1 oxygen atoms; more preferably, wherein each $R^3$ contains no oxygen atoms) (preferably, wherein each $R^3$ contains 0 nitrogen atoms) (preferably, wherein at least 50 mol % (preferably, 65 to 100 mol %; more preferably, 70 to 100 mol %; most preferably, 75 to 100 mol %) of the units of formula II in the organopolysiloxane contain at least one $R^2$). More preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane is a linear organopolysiloxane of formula III (III)

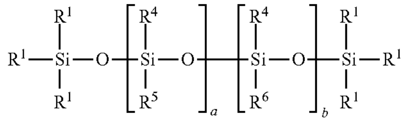

wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group) (preferably, wherein ≤one R per Si is a hydroxy group); wherein each $R^4$ is independently selected from the group consisting of a hydrogen, a group having 1 to 8 carbon atoms, an $R^5$ and an $R^6$ (preferably, wherein each $R^4$ is independently selected from the group consisting of a hydrogen and a group having 1 to 8 carbon atoms; more preferably, wherein each $R^4$ is independently selected from a $C_{1-4}$ alkyl group; still more preferably, wherein each $R^4$ is independently selected from a $C_{1-2}$ alkyl group; most preferably, wherein each $R^4$ is a methyl group); wherein each $R^5$ is independently selected from an acyclic group having 9 to 35 carbon atoms (preferably, 10 to 30 carbon atoms; more preferably, 10 to 20 carbon atoms; most preferably, 10 to 15 carbon atoms) (preferably, wherein each $R^5$ contains 0 to 1 oxygen atoms; more preferably, wherein each $R^5$ contains no oxygen atoms) (preferably, wherein each $R^5$ contains 0 nitrogen atoms); wherein each $R^6$ is independently selected from an alkylaryl group; wherein a is 10 to 500; wherein b is 0 to 250 and wherein a+b is 10 to 500 (preferably, 25 to 250; more preferably, 30 to 100; most preferably, 45 to 75) (preferably, wherein a≥b; more preferably, wherein a>b) (preferably, wherein ≥60 mol % (preferably, ≥65 mol %; more preferably, ≥70 mol %; most preferably, ≥75 mol %) of the Si atoms in the linear organopolysiloxane of formula I have an $R^5$ group attached) (preferably, wherein b=0). Most preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane is a linear organopolysiloxane of formula III; wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group) (preferably, wherein ≤one R per Si is a hydroxy group); wherein each $R^4$ is independently selected from the group consisting of a hydrogen, a group having 1 to 8 carbon atoms, an $R^5$ and an $R^6$ (preferably, wherein each $R^4$ is independently selected from the group consisting of a hydrogen and a group having 1 to 8 carbon atoms; more preferably, wherein each $R^4$ is independently selected from a $C_{1-4}$ alkyl group; still more preferably, wherein each $R^4$ is independently selected from a $C_{1-2}$ alkyl group; most preferably, wherein each $R^4$ is a methyl group); wherein each $R^5$ is an $-A_cR^7$ group; wherein each $R^7$ is independently selected from an acyclic group having 9 to 35 carbon atoms (preferably, an acyclic $C_{10-30}$ alkyl group; more preferably, an acyclic $C_{10-20}$ alkyl group; most preferably, an acyclic $C_{10-15}$ alkyl group) (preferably, wherein each $R^7$ is a hydrocarbyl group); wherein c is selected from the group consisting of 0 and 1 (preferably, wherein c is 0); and wherein A is a divalent linking; wherein each $R^6$ is a $—YR^8$ group; wherein Y is selected from the group consisting of a divalent alkylene group having 2 to 10 (preferably, 2 to 4; more preferably, 2) carbon atoms and 0 to 2 (preferably, 0 to 1; more preferably, 0) oxygen atoms; and wherein $R^8$ is at least one $—C_6R^9{}_6$ aromatic ring; wherein each $R^9$ is independently selected from a hydrogen, a halogen, a hydroxyl, a $C_{1-6}$ alkoxy group, a $C_{1-12}$ alkyl group or wherein two or more $R^9$ groups together represent a divalent hydrocarbon group joining together two or more aromatic rings (preferably, wherein each $R^6$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; most preferably, α-methyl styrene); wherein a is 10 to 500; wherein b is 0 to 250 and wherein a+b is 10 to 500 (preferably, 25 to 250; more preferably, 30 to 100; most preferably, 45 to 75) (preferably, wherein a≥b; more preferably, wherein a>b) (preferably, wherein ≥60 mol % (preferably, ≥65 mol %; more preferably, ≥70 mol %; most preferably, ≥75 mol %) of the Si atoms in the linear organopolysiloxane of formula III have an $R^5$ group attached) (preferably, wherein b=0).

Preferably, the organopolysiloxane of the drainage aid component has a degree of polymerization of 10 to 500. More preferably, the organopolysiloxane of the drainage aid component has a degree of polymerization of 25 to 250. Still more preferably, the organopolysiloxane has a degree of polymerization of 30 to 100. Most preferably, the organopolysiloxane of the drainage aid component has a degree of polymerization of 45 to 75.

Preferably, the organopolysiloxane of the drainage aid component is a linear organopolysiloxane; wherein the linear organopolysiloxane comprises <0.1 wt % (preferably, <0.01 wt %; more preferably, <0.001 wt %; most preferably, <detectable limit) of trifunctional siloxane units. Preferably, the organopolysiloxane of the drainage aid component is a linear organopolysiloxane; wherein the linear organopolysiloxane comprises <0.1 wt % (preferably, <0.01 wt %; more preferably, <0.001 wt %; most preferably, <the detectable limit) of trifunctional siloxane units; and wherein the linear organopolysiloxane comprises<the detectable limit of aromatic moieties (e.g., α-methyl styrene moieties).

The divalent linking group, A, when present in the organopolysiloxane of the drainage aid component, preferably consists of (i) oxygen; (ii) carbon and hydrogen; or (iii) carbon, hydrogen, oxygen and optionally nitrogen, sulfur and/or phosphorus. Oxygen when present in the divalent linking group, A, is selected from the group consisting of an ether oxygen, an ester oxygen, a substituted hydroxyl, a substituted alkoxy group and a combination thereof. Nitrogen when present in the divalent linking group, A, is selected from the group consisting of an amino group, an amido group and combinations thereof. The divalent linking group, A, when present in the organopolysiloxane of the drainage aid component is preferably selected from the group consisting of alkylene ester groups, alkylene ether groups, amide groups, polyamino/amido groups and mercapto groups, such as, —O—, $—CH_2CH_2OC(=O)—$, $—CH_2CH_2OCH_2CH(OH)—$, $—(CH_2)_3NHC(=O)—$, $—(CH_2)_3NHCH_2C(=O)—$, $—CH_2CH_2S—$ and

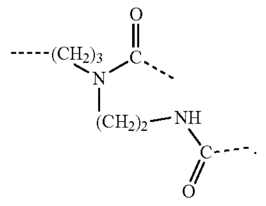

Preferably, the organopolysiloxane of the drainage aid component is nonionic.

Preferably, the drainage aid component, of the present invention, comprises: 1 to 30 wt % (preferably, 1 to 25 wt %; more preferably, 2 to 20 wt %; most preferably, 3 to 15 wt %), based on weight of the drainage aid component, of an organosilicon resin; wherein the organosilicon resin is comprised primarily of $R_3{}^{10}SiO_{1/2}$ and $SiO_{4/2}$ units (i.e., M and Q units, respectively); wherein each $R^{10}$ is selected from the group consisting of a functional or non-functional, substituted or unsubstituted monovalent radical (preferably, a hydroxyl group, a hydrocarbon group and a hydrocarbonoxy group). The number ratio of the M groups to Q groups is preferably 0.4:1 to 2.5:1 (more preferably, 0.4:1 to 1.5:1; most preferably, 0.5:1 to 1.1:1). While the organosilicon resin preferably contains only M and Q units, the organosilicon resin may include a limited number of $R_2{}^{10}SiO_{2/2}$ and $R^{10}SiO_{3/2}$ units (i.e., D and T units, respectively). Preferably, the organosilicon resin is an MQ silicone resin. As used herein, the term "MQ silicone resin" means that, on average, no more than 20 mole percent (preferably, no more than 15 mole percent; more preferably, no more than 10 mole percent; still more preferably, no more than 5 mole percent; most preferably, no more than 1 mole percent) of the organosilicon units are comprised of D and T units.

Preferably, the drainage aid component, of the present invention, comprises: 0 to 30 wt % (preferably, 0 to 20 wt %; more preferably, 0 to 15 wt %; most preferably, 0 to 8 wt %), based on weight of the drainage aid component, of a hydrophobic additive; wherein hydrophobic additive is selected from the group consisting of silica, titania, alumina, ground quartz, magnesium oxide, zinc oxide, salts of aliphatic carboxylic acids (e.g., calcium or aluminum stearates), reaction products of isocyanates with certain cyclohexylamine and alkyl amides (e.g., ethylene or methylene bis stearamide). More preferably, the drainage aid component, of the present invention, comprises: 0 to 30 wt % (preferably, 0 to 20 wt %; more preferably, 0 to 15 wt %; most preferably, 0 to 8 wt %), based on weight of the drainage aid component, of a hydrophobic additive; wherein the hydrophobic additive is selected from silica particles. Most preferably, the drainage aid component, of the present invention, comprises: 0 to 30 wt % (preferably, 0 to 20 wt %; more preferably, 0 to 15 wt %; most preferably, 0 to 8 wt %), based on weight of the drainage aid component, of a hydrophobic additive; wherein hydrophobic additive is selected from silica particles having an average particle size of 0.1 to 50 μm (preferably, 1 to 20 μm) and a surface area of at least 50 $m^2/g$. The silica particles may be rendered hydrophobic, e.g., by treating with dialkylsilyl groups and/or trialkylsilyl groups either bonded directly onto the silica or by means of a silicone resin. Preferably, the silica particles are rendered hydrophobic with dimethyl and/or trimethyl silyl groups. The silica materials may be selected from fumed silica, precipitated silica, hydrothermal silica and gel formation silica.

Preferably, the drainage aid component contains <0.1 wt %, based on weight of the drainage aid component, of a hydrophobic particulate material (e.g., silica, titania, alumina, ground quartz, magnesium oxide, zinc oxide, salts of aliphatic carboxylic acids (e.g., calcium or aluminium stearates), reaction products of isocyanates with certain materials (for example cyclohexylamine and alkyl amides, e.g., ethylene or methylene bis stearamide).

Preferably, the drainage enhancing aqueous fabric softener formulation of the present invention contains <3 wt % (preferably, <2 wt %; more preferably, <1 wt %; still more preferably, <0.1 wt %; yet more preferably, <0.01 wt %; most preferably, <0.0001 wt %) laundry detergent actives. Laundry detergent actives include, for example, detergent surfactants, detergent builders, bleaching agents, enzymes and mixtures thereof.

The drainage enhancing aqueous fabric softener formulation of the present invention, optionally further comprises an additive selected from the group consisting of a foam control agent, a surfactant scavenger, a dispersing agent, a stabilizer, a pH control agent, a metal ion control agent, a colorant, a brightener, an odor control agent, a soil release polymer, a preservative, an antimicrobial agent, a fragrance, a chlorine scavenger, an anti-shrinkage agent, a fabric crisping agent, a spotting agent, a germicide, a fungicide, an antioxidant (such as butylated hydroxy toluene), an anticorrosion agent, solvent and mixtures thereof.

The drainage enhancing aqueous fabric softener formulation of the present invention, optionally further comprises 0 to 10 wt %; (preferably, 0 to 5 wt %; more preferably 0 to 2 wt %), based on weight of the drainage enhancing aqueous fabric softener formulation, a foam regulator. More preferably, the drainage enhancing aqueous fabric softener formulation of the present invention, optionally further comprises 0 to 10 wt %; (preferably, 0 to 5 wt %; more preferably 0 to 2 wt %), based on weight of the drainage enhancing aqueous fabric softener formulation, of a foam regulator; wherein the foam regulator is selected from the group consisting of organomodified silicones, polydimethyl silicones and fatty acids; with the proviso that when the foam regulator is an organomodified silicone, said organomodified silicone is compositionally different from that included in the drainage aid component. Still more preferably, the drainage enhancing aqueous fabric softener formulation of the present invention, optionally further comprises 0 to 10 wt %; (preferably, 0 to 5 wt %; more preferably 0 to 2 wt %), based on weight of the drainage enhancing aqueous fabric softener formulation, of a foam regulator; wherein the foam regulator is a fatty acid. Most preferably, the drainage enhancing aqueous fabric softener formulation of the present invention, optionally further comprises 0 to 10 wt %; (preferably, 0 to 5 wt %; more preferably 0 to 2 wt %), based on weight of the drainage enhancing aqueous fabric softener formulation, of a foam regulator; wherein the foam control agent is selected from the group consisting of ethoxylated fatty alcohols having an alkyl chain containing 10 to 16 carbon atoms per molecule and having a degree of ethoxylation of 3 to 30; propoxylated fatty alcohols having an alkyl chain containing 10 to 16 carbon atoms per molecule and having a degree of propoxylation of 1 to 10; ethoxylated, propoxylated fatty alcohols having an alkyl chain containing 10 to 16 carbon atoms per molecule and having a degree of ethoxylation of 3 to 30 and a degree of propoxylation of 1 to 10; and mixtures thereof.

The drainage enhancing aqueous fabric softener formulation of the present invention, optionally further comprises 0 to 20 wt %, based on weight of the drainage enhancing aqueous fabric softener formulation, of a surfactant scavenger. Preferred surfactant scavengers include monoalkyl quaternary ammonium compounds and amine precursors thereof, polyvinyl amines, polyquaternary ammonium compounds and amine precursors thereof.

The drainage enhancing aqueous fabric softener formulation of the present invention, optionally further comprises 0 to 7 wt % (preferably, 0 to 5 wt %; more preferably, 0 to 3 wt %), based on weight of the drainage enhancing aqueous fabric softener formulation, of a dispersing agent. More preferably, the drainage enhancing aqueous fabric softener formulation of the present invention, optionally further comprises 0 to 7 wt %; (preferably, 0 to 5 wt %; more preferably 0 to 3 wt %), based on weight of the drainage enhancing aqueous fabric softener formulation, of a dispersing agent; wherein the dispersing agent for suspending materials in the rinse and for inhibiting their deposition on the washed fabric articles. Suitable nonionic surfactants can serve as dispersing agents including addition products of ethylene oxide and, optionally, propylene oxide, with fatty alcohols, fatty acids, fatty amines; propyleneoxide/ethyleneoxide block copolymers; and mixtures thereof.

The drainage enhancing aqueous fabric softener formulation of the present invention, optionally further comprises 0 to 20 wt % (preferably, 0 to 8 wt %; more preferably, 0 to 6 wt %), based on weight of the drainage enhancing aqueous fabric softener formulation, of a stabilizer. Preferably, the drainage enhancing aqueous fabric softener formulation of the present invention, optionally further comprises 0 to 20 wt % (preferably, 0 to 8 wt %; more preferably, 0 to 6 wt %), based on weight of the drainage enhancing aqueous fabric softener formulation, of a stabilizer; wherein the stabilizer is selected from the group consisting of xanthan gum; alginate; polysaccharide polymers (e.g., substituted cellulose materials like ethoxylated cellulose, carboxymethylcellulose, hydroxymethylcellulose, hydroxypropyl cellulose, hydroxyethyl cellulose, derivatives thereof and mixtures thereof). More preferably, the drainage enhancing aqueous fabric softener formulation of the present invention, optionally further comprises 0 to 20 wt % (preferably, 0 to 8 wt %; more preferably, 0 to 6 wt %), based on weight of the drainage enhancing aqueous fabric softener formulation, of a stabilizer; wherein the stabilizer includes xanthan gum.

The drainage enhancing aqueous fabric softener formulation of the present invention, optionally further comprises a pH control agent. Preferably, the drainage enhancing aqueous fabric softener formulation of the present invention, optionally further comprises 0 to 0.02 wt %, based on weight of the drainage enhancing aqueous fabric softener formulation, of a pH control agent. Preferred pH control agents include inorganic acids (e.g., hydrochloric acid, phosphoric acid), organic acids (e.g., citric acid, succinic acid).

The drainage enhancing aqueous fabric softener formulation of the present invention, optionally further comprises 0 to 20 wt % (preferably, 0 to 10 wt %; more preferably, 0 to 5 wt %), based on weight of the drainage enhancing aqueous fabric softener formulation, of a metal ion control agent. Preferred metal ion control agents include for example organo aminophosphonates (e.g., diethylene triamine penta(methylene phosphonate) and hexamethylene diamine tetra(methylene phosphonate); nitrilotriacetic acid; polyaminocarboxylic acids (e.g., ethylenediaminetetraacetic acid, ethylenetriamine pentaacetic acid, ethylenediamine disuccinic acid, ethylenediamine-N,N'-disuccinic acid); iminodiacetic acid derivatives (e.g., 2-hydroxyethyl diacetic acid, glyceryl iminodiacetic acid); and mixtures thereof.

The drainage enhancing aqueous fabric softener formulation of the present invention, optionally further comprises a dye or colorant. Dyes and colorants suitable for use in fabric softening formulations are well known.

The drainage enhancing aqueous fabric softener formulation of the present invention, optionally further comprises a brightener. Brighteners may include derivatives of stilbene, pyrazoline, coumarin, carboxylic acid, methinecyanines, dibenzothiphene-5,5-dioxide, azoles, heterocyclic 5-membered rings, heterocyclic 6-membered rings, fluorescent whitening agents, and mixtures thereof.

The drainage enhancing aqueous fabric softener formulation of the present invention, optionally further a soil release agent. Preferred soil release agents include copolymers having random blocks of ethylene terephthalate and polyethylene oxide terephthalate. The weight average molecular weight of the polymer soil release agents may preferably be 25,000 to 55,000 Daltons. Certain polymeric soil release agents may also be useful as stabilizing agents, for example, hydroxyether cellulosic polymers such as $C_{1-4}$ alkyl and $C_4$ hydroxyalkyl cellulose (e.g., hydroxyethyl cellulose).

The drainage enhancing aqueous fabric softener formulation of the present invention, optionally further comprises a preservative. More preferably, the drainage enhancing aqueous fabric softener formulation of the present invention, optionally further comprises 0 to 0.5 wt % (preferably, 0.0001 to 0.5 wt %; more preferably, 0.0002 to 0.2 wt %; most preferably, 0.0003 to 0.1 wt %), based on weight of the drainage enhancing aqueous fabric softener formulation, of a preservative.

The drainage enhancing aqueous fabric softener formulation of the present invention, optionally further comprises a solvent. More preferably, the drainage enhancing aqueous fabric softener formulation of the present invention, optionally further comprises a solvent; wherein the solvent is selected from the group consisting of ethanol; propanol; isopropanol; butanol; propylene glycol; glycerol; 1,3-butanediol; 1,3-hexanediol; dipropylene glycol and mixtures thereof.

Preferably, the method of washing laundry of the present invention, comprises: adding a soiled fabric article (preferably, wherein the soiled fabric article comprises cotton; more preferably, wherein the soiled fabric article is selected from cotton and a polyester cotton blend); dosing a wash water to the laundry washing machine or the laundry wash basin (preferably, to the laundry washing machine); dosing to the laundry washing machine or the laundry wash basin with a laundry detergent formulation; applying the wash water and the laundry detergent formulation to the soiled fabric article to provide a washed fabric article; dosing a rinse water to the laundry washing machine or the laundry wash basin (preferably, to the laundry washing machine); dosing a drainage enhancing aqueous fabric softener formulation of claim 1 to the laundry washing machine or the laundry wash basin; applying the rinse water to the washed fabric article; and spinning the rinse water from the washed fabric article in a spin cycle; wherein at least one of the wash water and the rinse water is exposed to the drainage enhancing aqueous fabric softener formulation before or during application thereof to at least one of the soiled fabric article and the washed fabric article (preferably, wherein the weight of residual water entrained with the washed fabric article at completion of the spin cycle using the drainage enhancing aqueous fabric softener formulation of the present invention divided by the weight of residual water entrained with the washed fabric article at completion of the machine rinse cycle using the same process but without addition of the drainage enhancing aqueous fabric softener formulation is ≤0.7 (preferably, ≤0.6; more preferably, ≤0.55; most preferably, ≤0.50)).

Preferably, the method of improving the energy efficiency of machine washing laundry of the present invention, comprises: adding a soiled fabric article to a laundry washing machine (preferably, wherein the soiled fabric article comprises cotton; more preferably, wherein the soiled fabric article is selected from cotton and a polyester cotton blend); selecting a drainage enhancing aqueous fabric softener formulation of the present invention; dosing the drainage enhancing aqueous fabric softener formulation to the laundry washing machine; dosing a laundry detergent formulation to the laundry washing machine; dosing a wash water to the laundry washing machine; applying the wash water and laundry detergent formulation to the soiled fabric article to provide a washed fabric article; dosing a rinse water to the laundry washing machine; applying the rinse water to the washed fabric article; and spinning the rinse water from the washed fabric article in a spin cycle; wherein at least one of the wash water and the rinse water is exposed to the drainage enhancing aqueous fabric softener formulation before or during application thereof to at least one of the soiled fabric article and the washed fabric article; and wherein the organopolysiloxane in the selected drainage enhancing aqueous fabric softener formulation is chosen based on the ability to reduce residual water entrained with the washed fabric article at completion of the spin cycle (preferably, wherein the weight of residual water entrained with the washed fabric article at completion of the spin cycle using the drainage enhancing aqueous fabric softener formulation of the present invention containing the selected organopolysiloxane divided by the weight of residual water entrained with the washed fabric article at completion of the machine rinse cycle using the same process but without addition of the drainage enhancing aqueous fabric softener formulation is ≤0.7 (preferably, ≤0.6; more preferably, ≤0.55; most preferably, ≤0.50)).

Some embodiments of the present invention will now be described in detail in the following Examples.

Examples A1-A2: Orgoanopolysiloxanes

The organopolysiloxanes of Examples A1-A2 having the general formula

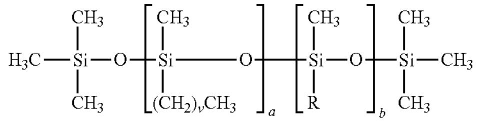

wherein the values of R, a, b and v are reported in Table 1.

TABLE 1

| Ex. | R | a | b | v |
|---|---|---|---|---|
| Example A1 | α-methyl styrene | 48 | 12 | 1 |
| Example A2 | α-methyl styrene | 48 | 12 | 11 |

Example AF1: Antifoam Component

An antifoam composition comprising the ingredients as noted in Table 2 was prepared by homogenizing the ingredients in a dental mixer set at 3,500 rpm for 30 seconds and then in a high shear mixer (silverson) set at 6,000 rpm for one minute.

TABLE 2

| Ingredient | Example AF1 (wt %) |
|---|---|
| Example A1 | 87.3 |
| MQ silicone resin[a] | 6.7 |
| Precipitated $SiO_2$[b] | 6.0 |

[a]Trimethylsilylated resin with a total M/Q ratio of 0.96/1 dissolved in 60% octyl stearate

[b]SIPERNAT ® D 10 (≥97% precipitated $SiO_2$ having a d50 particle size of 6.5 μm) available from Evonik Example AFG1: Antifoam Granules An antifoam granule was prepared by combining the antifoam component from Example AF1 with the other ingredients as noted in Table 3. The binder and dodecylbenzene sulfonic acid were weighed into a container and homogenized with a mechanical stirrer (10 min/400 rpm). The water and the antifoam component were then added to the contents of the container with agitation. The contents of the container were then poured onto the zeolite carrier in a food mixer. The mixture was then dried in a fluidized bed over 20 minutes at 60° C. and sieved between 250 μm and 1,400 μm to provide the product antifoam granules.

TABLE 3

| Ingredient | Example AFG1 (wt %) |
|---|---|
| Polyacrylic binder[1] | 13.96 |
| Dodecylbenzene sulfonic acid (DBSA)[2] | 1.80 |
| Water | 11.02 |
| Example AF1 | 9.53 |
| Zeolite carrier[3] | 63.69 |

[1]Sokalan PA 25 PN ~54 wt % solids in water available from BASF

[2]Marlon AS3 available from Sasol

[3]Sodium aluminum silicate available from PQ

Example DAC: Drainage Aid Component

A drainage aid component emulsion of Example DAC comprising the ingredients noted in Table 4 was prepared by homogenizing the ingredients in a dental mixer set at 3,500 rpm for 30 seconds and then in a high shear mixer (silverson) set at 6,000 rpm for one minute.

TABLE 4

| Example | Ingredient | | | |
|---|---|---|---|---|
| | Organopolysiloxane | wt % | Resin | wt % |
| Example DAC | Example 1 | 80.0 | MQ silicone resin[a] | 20.0 |

[a]Trimethylsilylated resin with a total M/Q ratio of 0.96/1 dissolved at 60% in octyl stearate.

Example DAE: Drainage Aid Emulsion

An emulsion was prepared using the drainage aid component of Example DAC with other ingredients as noted in Table 5 by melting the surfactant blend and weighing out and combining the molten surfactant blend and the drainage aid component in a container and placing the container in an oven at 60° C. for 10 minutes. Then homogenizing the contents of the container in a dental mixer at 3,500 rpm for 30 seconds. Combining the non-ionic hydroxyethyl cellulose w/glyoxal, the xanthum gum, the microbicide and the water to form a solution. Then adding the solution to the homogenized contents in the dental mixer and homogenizing in the dental mixer at 3,500 rpm for 30 sec to provide the drainage aid emulsion.

TABLE 5

| Ingredient | wt % |
|---|---|
| 1:1 Blend of steareth 2 and steareth 20[a] | 3.31 |
| Example DAC | 20.35 |
| Non-ionic hydroxyethyl cellulose w/ glyoxal[b] | 1.80 |
| Xanthum gum[c] | 0.59 |
| Demineralized water | 73.87 |
| Microbicide[d] | 0.08 |

[a]VOLPO ™ S2/S20 available from Croda

[b]Natrosol LR available from Ashland

[c]Keltrol RD available from CP Kelco

[d]Kathon LXE 1.5% available from IFF

Comparative Example CFC and Example FC1: Fabric Conditioner Formulation

A fabric conditioner formulation was prepared in each of Comparative Example CFC and Example FC1 with the ingredients as noted in Table 6. The weigh the

TABLE 6

| Ingredient | Example CFC | Example FC1 |
|---|---|---|
| | wt % | wt % |
| Esterquata | 100 | 99.85 |
| Example DAE | — | 0.18 |

[a]Tetranyl L6/90 available from Kao diluted to a 12 wt % solution in water

Comparative Example C1 and Example 1: Residual Water

All tests were run in a Miele W1914 front loading washing machine. The machine was loaded with 11 terry towels and 15 liters of water at a hardness of 10° french degree. Antifoam granules from Example AFG1 (0.375 g)

was combined using a spatula with 125 g of powder laundry detergent (Standard detergent formula 1998, ISO 105-C08: 2010 available from wfk-Testgewebe GmbH) and was then loaded into the washing machine. The washing machine was then started using the Color program set at 40° C., short program and 800 rpm. The foam height was monitored every 5 minutes during the 60 min. wash and the following rinse cycle (0 being no foam and 100 being the full window of foam) as recorded in TABLE 8. The fabric conditioner formulation (4 g) noted in TABLE 7 was added in the last rinse. At the end of the rinse cycle, the load of terry towels was removed and weighted to check the residual water content in kg at the end of the wash as recorded in TABLE 7.

TABLE 7

| Example | Fabric Conditioner formulation | Residual water (kg) |
|---|---|---|
| C1 | Comparative Example CFC | 3.6 |
| 1 | Example FC1 | 1.6 |

TABLE 8

| Time | C1 | 1 |
|---|---|---|
| 0 | 0 | 0 |
| 5 | 5 | 5 |
| 10 | 20 | 20 |
| 15 | 48 | 40 |
| 20 | 83 | 65 |
| 25 | 95 | 83 |
| 30 | 95 | 95 |
| 35 | 95 | 98 |
| 40 | 100 | 100 |
| 45 | 100 | 100 |
| 50 | 100 | 100 |
| 55 | 38 | 20 |
| 60 | 30 | 30 |
| 65 | 33 | 15 |
| 70 | 43 | 13 |
| 75 | 43 | 28 |
| 80 | 33 | 38 |
| 85 | 30 | 30 |
| 90 | 38 | 33 |
| 95 | 33 | 28 |
| 100 | 30 | 20 |
| 105 | 28 | 15 |
| 110 | 15 | 10 |
| 115 | 13 | 5 |
| 120 | 0 | 5 |
| 125 | 0 | 0 |
| 130 | 0 | 0 |

We claim:

1. A drainage enhancing aqueous fabric softener formulation, comprising:

9.992 to 98.992 wt %, based on weight of the drainage enhancing aqueous fabric softening formulation, of water;

1 to 90 wt %, based on weight of the drainage enhancing aqueous fabric softening formulation, of a fabric softening agent; and 0.008 to <0.1 wt %, based on weight of the drainage enhancing aqueous fabric softener formulation, of a drainage aid component, wherein the drainage aid component comprises:

40 to 99 wt %, based on weight of the drainage aid component, of an organopolysiloxane comprising:

0 to 60 mol % of units of formula I $$R_x^1SiO_{(4-x)/2} \quad (I)$$

40 to 100 mol % of units of formula II $$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^1$ is independently selected from a hydrogen, a hydroxy group and a group having 1 to 8 carbon atoms; wherein each $R^2$ is an $-A_cR^3$ group; wherein A is a divalent linking group; wherein c is selected from the group consisting of 0 and 1; wherein each $R^3$ is independently selected from a group having 9 to 35 carbon atoms;

1 to 30 wt %, based on weight of the drainage aid component, of an organosilicon resin; and 0 to 30 wt %, based on weight of the drainage aid component, of a hydrophobic additive.

2. The drainage enhancing aqueous fabric softener formulation of claim 1, further comprising an additive selected from the group consisting of a foam control agent, a surfactant scavenger, a dispersing agent, a stabilizer, a pH control agent, a metal ion control agent, a colorant, a brightener, an odor control agent, a soil release polymer, a preservative, an antimicrobial agent, a fragrance, a chlorine scavenger, an anti-shrinkage agent, a fabric crisping agent, a spotting agent, a germicide, a fungicide, an antioxidants, an anticorrosion agent and mixtures thereof.

3. The drainage enhancing aqueous fabric softener formulation of claim 2, wherein the drainage enhancing aqueous fabric softener formulation contains <3 wt % laundry detergent actives.

4. The drainage enhancing aqueous fabric softener formulation of claim 1, wherein the organopolysiloxane is a linear organopolysiloxane of formula III (III)

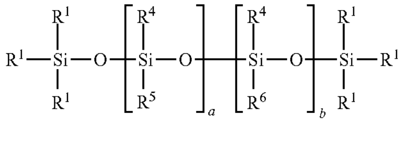

wherein each $R^1$ is a methyl group; wherein each $R^4$ is independently selected from the group consisting of a hydrogen, a group having 1 to 8 carbon atoms, an $R^5$ and an $R^6$; wherein each $R^5$ is an $-A_cR^7$ group; wherein each $R^7$ is independently selected from an acyclic group having 10 to 20 carbon atoms; wherein c is selected from the group consisting of 0 and 1; and wherein A is a divalent linking group consisting of (i) oxygen; (ii) carbon and hydrogen or (iii) carbon, hydrogen, oxygen, and optionally, nitrogen, sulfur or phosphorus; wherein each $R^6$ is independently from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; wherein a is 10 to 500; wherein b is 0 to 250; wherein a+b is 10 to 500; wherein a>b; and wherein ≥60 mol % of the Si atoms in the linear organopolysiloxane of formula III have an $R^5$ group attached.

5. The drainage enhancing aqueous fabric softener formulation of claim 1, further comprising 0 to 10 wt % of a foam control agent, wherein the foam control agent is selected from the group consisting of ethoxylated fatty alcohols having an alkyl chain containing 10 to 16 carbon atoms per molecule and having a degree of ethoxylation of 3 to 30; propoxylated fatty alcohols having an alkyl chain containing 10 to 16 carbon atoms per molecule and having a degree of propoxylation of 1 to 10; ethoxylated, propoxylated fatty alcohols having an alkyl chain containing 10 to 16 carbon atoms per molecule and having a degree of ethoxylation of 3 to 30 and a degree of propoxylation of 1 to 10; and mixtures thereof.

6. The drainage enhancing aqueous fabric softener formulation of claim 5, further comprising a stabilizer.

7. The drainage enhancing aqueous fabric softener formulation of claim 6, further comprising a surfactant scavenger.

8. The drainage enhancing aqueous fabric softener formulation of claim 7, wherein the organopolysiloxane is a linear organopolysiloxane of formula III (III)

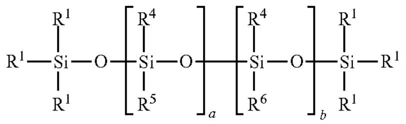

wherein each $R^1$ is a methyl group; wherein each $R^4$ is independently selected from the group consisting of a hydrogen, a group having 1 to 8 carbon atoms, an $R^5$ and an $R^6$; wherein each $R^5$ is an $-A_cR^7$ group; wherein each $R^7$ is independently selected from an acyclic group having 10 to 20 carbon atoms; wherein c is selected from the group consisting of 0 and 1; and wherein A is a divalent linking group consisting of (i) oxygen; (ii) carbon and hydrogen or (iii) carbon, hydrogen, oxygen, and optionally, nitrogen, sulfur or phosphorus; wherein each $R^6$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; wherein a is 10 to 500; wherein b is 0 to 250; wherein a+b is 10 to 500; wherein a>b; and wherein ≥60 mol % of the Si atoms in the linear organopolysiloxane of formula III have an $R^5$ group attached.

9. A method for washing laundry comprising:
- adding a soiled fabric article to a laundry washing machine or a laundry wash basin;
- dosing a wash water to the laundry washing machine or the laundry wash basin;
- dosing to the laundry washing machine or the laundry wash basin with a laundry detergent formulation;
- applying the wash water and the laundry detergent formulation to the soiled fabric article to provide a washed fabric article;
- dosing a rinse water to the laundry washing machine or the laundry wash basin;
- dosing a drainage enhancing aqueous fabric softener formulation of claim 1 to the laundry washing machine or the laundry wash basin;
- applying the rinse water to the washed fabric article; and
- spinning the rinse water from the washed fabric article in a spin cycle;
- wherein at least one of the rinse water is exposed to the drainage enhancing aqueous fabric softener formulation before or during application thereof to the washed fabric article.

10. A method of improving the energy efficiency of machine washing laundry, comprising:
- adding a soiled fabric article to a laundry washing machine;
- selecting a drainage enhancing aqueous fabric softener formulation according to claim 1;
- dosing the drainage enhancing aqueous fabric softener formulation to the laundry washing machine;
- dosing a laundry detergent formulation to the laundry washing machine;
- dosing a wash water to the laundry washing machine;
- applying the wash water and laundry detergent formulation to the soiled fabric article to provide a washed fabric article;
- dosing a rinse water to the laundry washing machine;
- applying the rinse water to the washed fabric article; and
- spinning the rinse water from the washed fabric article in a spin cycle;
- wherein the rinse water is exposed to the drainage enhancing aqueous fabric softener formulation before or during application thereof to the washed fabric article; and wherein the organopolysiloxane in the selected solid laundry drainage aid composition is chosen based on the ability to reduce residual water entrained with the washed fabric article at completion of the spin cycle.

* * * * *